United States Patent [19]

Hall

[11] Patent Number: 5,223,202
[45] Date of Patent: Jun. 29, 1993

[54] METHOD FOR MAKING CORROSION AND ABRASION RESISTANT KNIFE GATE AND OTHER VALVE TYPES

[76] Inventor: Charles E. Hall, 2287 W. Riverside Dr., Salem, Va. 24153

[21] Appl. No.: 660,843

[22] Filed: Feb. 26, 1991

[51] Int. Cl.[5] .................... B29C 39/26; B29C 45/14; B29C 45/36; B29C 39/10
[52] U.S. Cl. .................. 264/219; 264/267; 264/275; 264/277; 264/299; 264/328.1; 249/95; 249/145
[58] Field of Search ............ 264/267, 269, 259, 328.1, 264/219, 275, 278, 279, 277, 299; 249/95, 145

[56] References Cited

U.S. PATENT DOCUMENTS

| | | |
|---|---|---|
| 2,942,841 | 6/1960 | Stillwagon . |
| 3,026,899 | 3/1962 | Mischanski . |
| 3,206,530 | 9/1965 | Boteler . |
| 3,438,388 | 4/1969 | Schenck, Jr. . |
| 3,542,338 | 11/1970 | Scaramucci . |
| 3,545,480 | 12/1970 | Gustafson . |
| 3,675,888 | 7/1972 | Scaramucci ............ 249/95 |
| 3,771,764 | 11/1973 | Miyauchi ............ 249/145 |
| 3,825,030 | 7/1974 | Kalsi . |
| 3,993,092 | 11/1976 | Still . |
| 4,009,727 | 3/1977 | Bailey . |
| 4,047,275 | 9/1977 | Bake et al. . |
| 4,051,863 | 10/1977 | Still . |
| 4,201,365 | 5/1980 | Paptzun et al. . |
| 4,257,447 | 3/1981 | Clarkson . |
| 4,377,274 | 3/1983 | Mayhew, Jr. . |
| 4,646,407 | 3/1987 | Mayhew, Jr. . |
| 4,676,268 | 6/1987 | Sano . |
| 4,688,597 | 8/1987 | Clarkson et al. . |
| 4,798,365 | 1/1989 | Mayhew . |

Primary Examiner—Jan H. Silbaugh
Assistant Examiner—A. Ortiz
Attorney, Agent, or Firm—Sterne, Kessler, Goldstein & Fox

[57] ABSTRACT

A method and apparatus for manufacturing a bidirectional, corrosion and abrasion resistant gate valve body. In one embodiment, the gate valve body, including flange seals and a liner, are produced in a single molding operation. A mold with appropriate coring either forms or aligns any desired mounting inserts. Coring is also provided to properly form a packing area, gate passage, fluid passages, and flange mounting seals. Once the mounting inserts have been positioned in the mold cavity, the mold sections are secured together, and a filler material, preferably a thermoplastic resin, is injected into the cavity. Upon hardening of the filler material, the inserts are secured into position. Further, the entire body and liner are a single solid unit comprising the packing cavity, the gate slot for sealing flow areas, the flow passages, and the flange rings for sealing connection of the valve to other mating surfaces. In another embodiment, a valve liner is placed within the mold cavity before filler material is added. The valve liner, instead of the mold, defines the packing area, gate passage, fluid passages, and flange mounting seals.

6 Claims, 2 Drawing Sheets

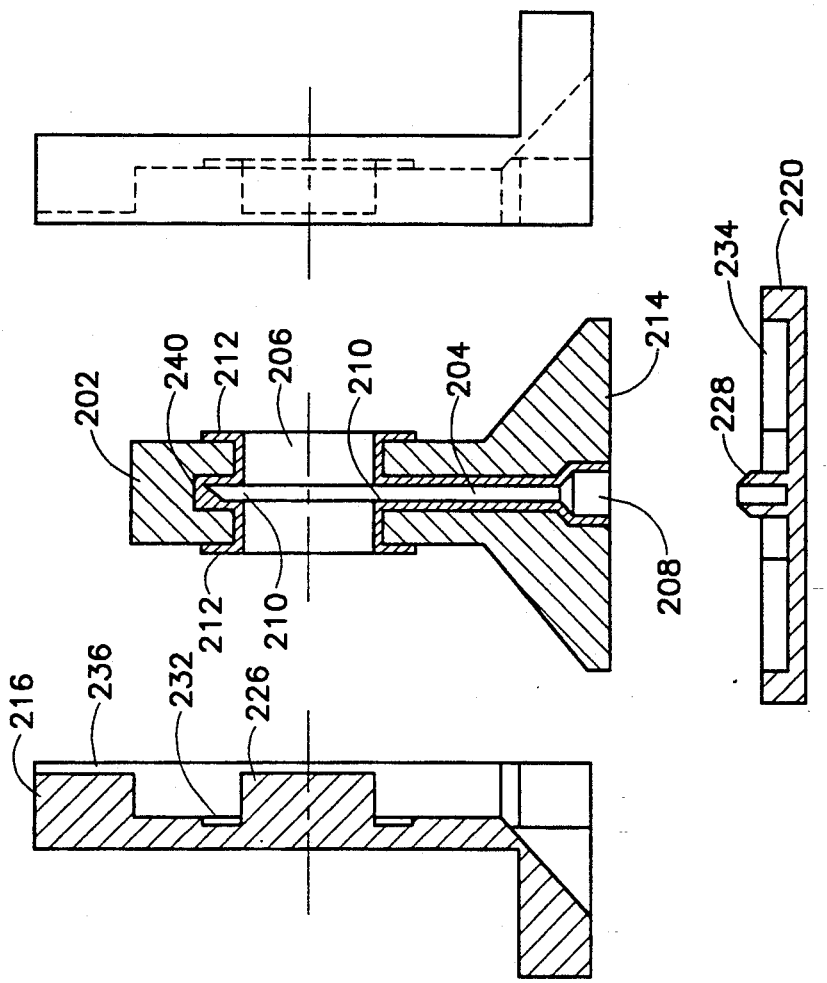
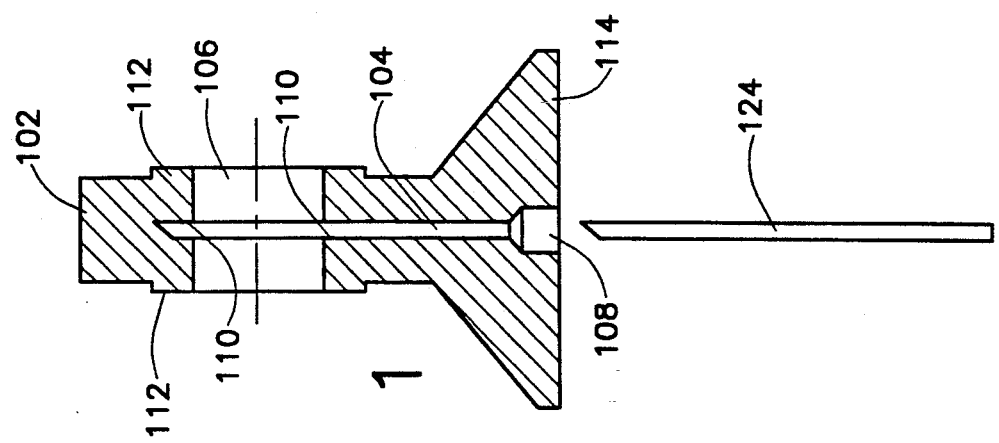

METHOD FOR MAKING CORROSION AND ABRASION RESISTANT KNIFE GATE AND OTHER VALVE TYPES

BACKGROUND OF THE INVENTION

I. Field of the Invention

The present invention relates generally to mechanical pipe valves, and more particularly, to corrosion and abrasion resistant knife gate valves and other valve types.

II. Related Art

Historically, knife gate valves were designed for paper-pulp flow systems. The knife gate valves can quickly provide large openings through pipe lines, while not suffering from jams or malfunctions caused by large particles in the flow. The idea is that the sharp gate blade of the knife gate valve can easily cut through the pulp fluid during closure of the valve.

Since the introduction of knife gate valves, their use has been extended into numerous other applications. For example, knife gate valves are now used to control the flow of vacuums; abrasive slurries, such as coal slurry; sewage; active chemicals, such as strong acids, bases, and other solvents; petroleum products, and the like. Many of the fluids and gases to be controlled are abrasive and/or corrosive, and furthermore, many require that the knife gate valve exhibit bubble-tight characteristics to ensure that no fluid seepage occurs around the gate.

In the conventional art, constructing corrosion and abrasion resistant as well as bubble-tight knife gate valves is problematic. Construction materials which are corrosion and abrasion resistant are often expensive, weak, and/or difficult to machine and assemble. As a result, a common practice in the art has been to construct knife gate valves with corrosion resistant liners, which cover those surfaces in contact with corrosive fluids, housed within inexpensive outer frames or housings. The state of the art in this regard is described below in terms of exemplary U.S. Patents.

U.S. Pat. No. 3,026,899 to Mischanski, U.S. Pat. No. 3,206,530 to Boteler, and U.S. Pat. No. 3,438,388 to Schenck suggest using fluorocarbon resin liners for valves to protect a valve body from corrosive fluids. The Mischanski patent and the Boteler patent suggest that a liner can be molded separately or in a valve body. Schenck teaches first heating a tube of fluorocarbon resin and then pressurizing the resin against the inner walls of a valve body via a gas. However, the valves of the foregoing patents still require packing, gaskets and the like at the interface between the valving elements and their seats to insure bubble-tight characteristics. Moreover, separation of the liner from the valve body can occur, and construction of the valves is labor intensive and expensive.

U.S. Pat. No. 3,545,480 to Guatafzon teaches a valve and method in which a corrosion resistant sheet metal liner is positioned within a cast metal housing. The metal liner is first constructed from several sections. Next, the liner is surrounded by the cast metal housing, which is machined to fit the liner. The method of manufacture is expensive due to the time and labor necessary to machine parts and assemble the valve. Moreover, the resultant liner has undesirable cracks or cavities between the liner elements themselves and also the housing, which must be remedied by welding the cracks or by filling them with plastics. Finally, the valve operates in only one direction.

U.S. Pat. No. 3,825,030 to Kalsi discloses a plastic liner for a valve to handle corrosive fluids. First, a valve body is cast with spaced recesses on the inner circumference. The plastic liner is then injection molded into the inner circumference of the valve. The spaced recesses interlock with portions of the liner to thereby secure the liner in place and prevent separation of the liner from the valve body. However, the construction of this valve requires considerable time, machining, and labor, and is accordingly expensive.

U.S. Pat. No. 3,993,092 to Still, U.S. Pat. No. 4,009,727 to Bailey, and U.S. Pat. No. 4,051,863 to Still describe gate valves having cast outer bodies with replaceable inner liners. However, the liners can get separated from the outer bodies of the gate valves, thereby providing a passage for fluid when the liner wears through. Moreover, the manufacture and assembly of the gate valves is expensive due to the time and labor involved.

Finally, U.S. Pat. No. 4,646,407 to Mayhew and U.S. Pat. No. 4,377,274 to Mayhew respectively disclose a knife gate valve with a plastic or fluoropolymer liner and a method for constructing the same. A heavy cast iron valve body is utilized. A liner comprises three inserts which are formed in a valve housing around the knife gate after the valve housing has already been constructed. However, the foregoing valve and method is labor intensive and requires extensive machining for the body and massive molding machines for the liner. Additionally, liners of the type described in the Mayhew patents tend to shrink away from the body thereby providing a passage for fluid when the liner wears through.

Thus, the apparatus and methods in the conventional art require extensive labor, time-intensive and complex machining processes, and specialized equipment. Furthermore, the bubble-tight characteristics of many valves are compromised in attempts to provide a corrosion and/or abrasion resistant valve via a valve liner.

The present invention provides a method and apparatus for manufacturing a bidirectional gate valve, particularly a knife gate valve, which is corrosion and abrasion resistant, bubble-tight, and inexpensive to manufacture and assemble.

SUMMARY OF THE INVENTION

In accordance with the present invention, a corrosion and abrasion resistant as well as bubble-tight valve, for example, a knife gate valve, is made by pouring or injecting a filler material, for example, a thermoplastic resin, into the mold cavity of a mold apparatus. The resultant valve is in unitary form. The mold cavity is provided with coring to properly form the packing area, gate passage, fluid passages, and flanges. Moreover, the coring can secure and align mounting inserts placed within the mold in any desired configuration. The mounting inserts are for interfacing the valve into a pipe line.

In another aspect of the present invention, a unitary gate valve is produced with a valve liner. The valve liner is placed inside the mold apparatus before introducing a filler material into the mold cavity. The valve liner is made of rigid material which will adhere to the cured filler material. The valve liner defines the packing area, gate passage, fluid passages, and flanges. The liner is reaction bonded and essentially unitary with respect to the valve outer body.

Thus, the result of the present invention is that a unitary gate valve can be formed entirely from a filler material or formed from a liner of rigid material and coated with a filler material.

The present invention overcomes the deficiencies of the prior art, and further provides for the following additional advantages.

The present invention provides for a mold apparatus and method for producing a corrosion and abrasion resistant, unitary gate valve without a valve liner and which is bubble-tight with no sealing problems. No need exists for additional seals, gaskets, seats, or other sealant materials.

The gate valve produced in accordance with the present invention can have many different throat or throughway forms, including a reduction from one pipe size to another, with little change in the manufacturing process or tooling.

The unitary gate valve of the present invention is inexpensive. The valve can be produced in a single molding operation. In other words, no extensive machining and assembly of valve parts is required.

The unitary gate valve produced by the present invention can be completely manufactured from a variety of filler materials, for example, resins, including thermoplastic resin; plastics, including polyethylene; epoxy; rubber; fluorocarbon polymers; glass; TEFLON (DuPont trademark) materials, metal or metal alloys, including titanium, tantalum, iron, and steel, fabricated or cast metals, etc., depending on the application of the valve, the desired weight of the valve, the composition of the mold (to prevent adverse reactions between the liner and mold apparatus), and the monetary costs associated with manufacture.

In accordance with the present invention, a valve liner may be introduced into the mold apparatus before filler material is added. The valve liner is coated with a filler material to thereby form a gate valve without the need for additional seals, gaskets, seats, or other sealant materials. Because the liner is reaction bonded to the filler material, the liner is essentially unitary with respect to the valve outer body. Further, the valve liner can have many different throat or throughway forms, including a reduction from one pipe size to another.

The mold apparatus for the valve body may be constructed from inexpensive materials, for example, thermoplastic resin; other plastics, including polyethylene; epoxy; rubber; fluorocarbon polymers; glass; TEFLON (DuPont trademark) materials, metal or metal alloys, including titanium, tantalum, iron, and steel, fabricated or cast metals, etc., so long as no adverse reaction occurs between the mold apparatus and the inserted filler material. The mold apparatus may be constructed in the form of a valve shell from materials such as a fiberglass composite or a thermoplastic via vacuum forming or other process, and accordingly, the mold apparatus can become the permanent outer skin of the valve body. The foregoing method is very economical because it eliminates the need for permanent mold apparatuses.

Further features and advantages of the present invention will become apparent to one skilled in the art upon examination of the following drawings and Detailed Description. It is intended that any additional features and advantages be incorporated herein.

BRIEF DESCRIPTION OF THE DRAWINGS

The present invention as defined in the claims can be better understood with reference to the text and to the following drawings. The drawings are not necessarily to scale, emphasis instead being placed upon clearly illustrating principles of the present invention.

FIG. 1 is an exploded cross-sectional view of a unitary gate valve body molded from a filler material in accordance with the present invention without the introduction of a valve liner;

FIG. 2 is an exploded cross-sectional view of a unitary gate valve body molded with an inserted valve liner from a filler material and the corresponding mold members for producing the same in accordance with the present invention.

DETAILED DESCRIPTION OF THE PREFERRED EMBODIMENT

Figure 3:
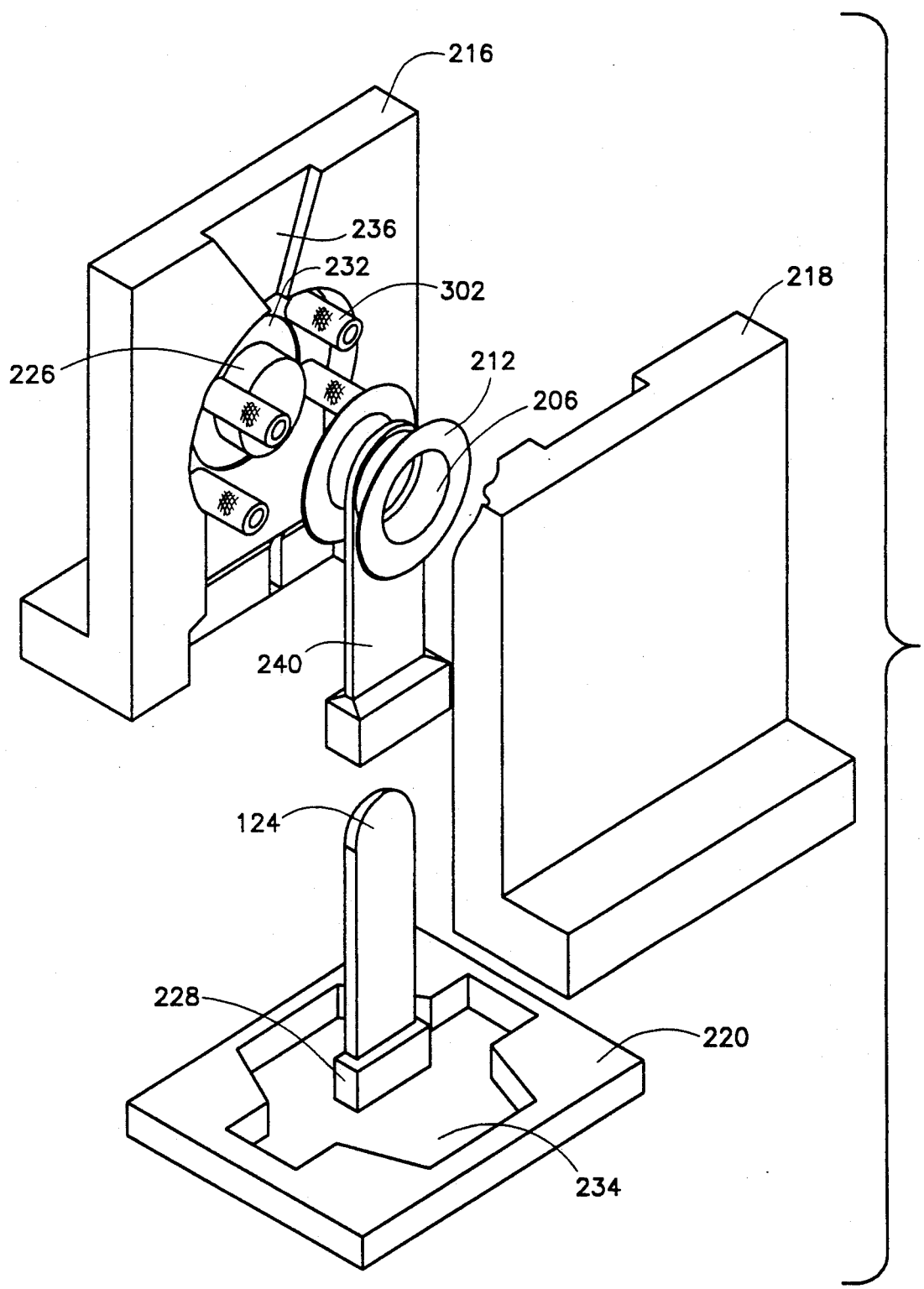
FIG. 3 is an isometric view of the mold apparatus in accordance with the present invention for producing the gate valve bodies illustrated in FIGS. 1 and 2.

FIG. 1 is an exploded cross-sectional view of a unitary gate valve body 102 molded from filler material, such as a thermoplastic or other resin, in a single molding operation in accordance with the present invention without the introduction of a valve liner. The valve body 102 provides for a bidirectional, corrosion and abrasion resistant as well as bubble-tight gate valve.

In unitary form, the valve body 102 includes a gate passage 104 for ingress and egress of a knife gate (not shown), a fluid passage 106 for the flow of a potentially corrosive or abrasive fluid or gas, a packing area 108, valve gate seats 110 for bidirectional sealing (bubble-tight), pipe flanges 112 for sealing the connection of the valve to other mating surfaces (not shown), such as pipes, and an upper flange 114 for abutting the driving mechanism for the knife gate of the valve. No need exists for additional seals, gaskets, seats, or other sealant materials when the valve body 102 is provided with a gate and interfaced to other mating surfaces, such as pipes.

A mold apparatus for forming the gate valve body 102 in accordance with the present invention is illustrated in FIG. 3. A gate core 124, which is part of the mold apparatus, is shown in FIG. 1 aligned with the gate passage 104. The mold apparatus and method for operating the same are discussed in further detail below in regard to FIG. 3.

FIG. 2 is an exploded cross-sectional view of a unitary gate valve body 202 molded from a filler material with an inserted valve liner 240 in accordance with the present invention. The valve body 202 includes a gate passage 204 for ingress and egress of a knife gate (not shown), a fluid passage 206 for the flow of a potentially corrosive or abrasive fluid or gas, a packing area 208, valve gate seats 210 for bidirectional sealing (bubble-tight), pipe flanges 212 for sealing the connection of the valve to other mating surfaces (not shown), and an upper flange 214 for abutting the driving mechanism for the knife gate of the valve.

Further shown in FIG. 2, as well as in FIG. 3, are the mold members of an exemplary mold apparatus for producing both of the unitary gate valve bodies 102 and 202 in accordance with the present invention. In the preferred embodiment, the mold apparatus includes valve body mold halves 216 and 218 and a base 220. Any embodiment encompassing similar purpose and functionality and, specifically, having any number of mold members is intended to be incorporated herein.

When manufacturing the valve body 102, the mold apparatus is provided with coring for the purpose of forming the gate passage 104, packing area 108, fluid passage 106, valve gate seats 110, pipe flanges 112, and upper flange 114. More specifically, in the preferred embodiment, the valve body mold halves 216 and 218 of FIG. 2 provide the coring for the gate fluid passage 106 via fluid passage core 226, packing area 108 via core 228, and pipe flanges 112 via gasket cavity 232.

In addition, the diameters of the cylinder-like fluid passage core 226 on each of the valve body mold halves 216 and 218 could be varied so as to provide for different throat or throughway structures, including a reduction from one pipe size to another, with little change in the manufacturing process or tooling.

Further, the base 220 of the mold apparatus provides the coring for the purpose of forming the gate passage 104, valve gate seats 110, and upper flange 114. A removable gate core 124 forms the gate passage 104 and the valve gate seats 110. Finally, an upper flange cavity 234 serves to mold the upper flange 114 in any desired configuration.

The mold apparatus comprises coring in the valve body mold halves 216 and 218 for the purpose of properly aligning and securing mounting inserts 302, shown in FIG. 3. In this document, "mounting inserts" refers to any receiver or engagement entity for a fastener, for example, a screw, pin, rod, rivet, etc. Further, the mold apparatus may enclose any number of mounting inserts which may be placed in any conventional or preferable configuration.

When manufacturing the valve body 202 of FIG. 2, the configuration and coring of the mold apparatus remains substantially the same. However, the removable gate core 124 is removed. As a result, a liner 240 may be inserted into the mold apparatus before filler material is introduced and secured about the mold core 228. The valve liner 240 is made of rigid material which will adhere to the cured filler material. The valve liner 240, not the valve body mold halves 216 and 218, defines the gate fluid passage 106, the packing area 108, and pipe flanges 112.

The mold apparatus may be constructed from inexpensive materials, for example, resins, including thermoplastic resin; plastics, including polyethylene; epoxy; rubber; fluorocarbon polymers; glass; TEFLON (DuPont trademark) materials, metal or metal alloys, including titanium, tantalum, iron, and steel, fabricated or cast metals, etc., so long as no adverse reaction occurs with the introduced filler material, which is discussed in detail below. FIG. 2 illustrates a cast type mold, but other types of molds are envisioned and may be utilized.

Furthermore, the mold apparatus may be constructed in the form of a shell from materials such as a fiberglass composite or a thermoplastic via vacuum forming or other process, and accordingly, the mold apparatus can become the permanent outer skin of the valve body. The foregoing method is very economical because it eliminates the need for permanent mold apparatuses.

A method envisioned by the present invention for producing the valve bodies 102 and 202 of respective FIGS. 1 and 2 in a single molding operation will now be specifically described with reference to FIG. 3. As shown in FIG. 3, the valve body mold halves 216 and 218 are secured together on the base 220 during operation, to thereby form the mold apparatus. During the process of securing the mold members, mounting inserts 302, as noted above, can be placed in interior region of the mold apparatus. If the valve body 102 is to be produced, then no valve liner is inserted, and the gate core 124 remains affixed to the base 220. If the valve body 202 is to be produced, then a valve liner 240 is positioned in the mold apparatus about the core 228, after removal of the gate core 124.

Next, a filler material in substantially liquified form is introduced into a filler material gate 236 and allowed to harden within the mold apparatus. The filler material can be, for example, resins, including thermoplastic resin; plastics, including polyethylene; epoxy; rubber; fluorocarbon polymers; glass; TEFLON (DuPont trademark) materials, metal or metal alloys, including titanium, tantalum, iron, and steel, fabricated or cast metals, etc., depending on the application of the valve and the composition of the mold apparatus (to prevent adverse reactions between the filler material and the mold apparatus).

During solidification of the filler material, any mounting inserts 302 and, if applicable, any valve liner 240 are bonded together within a unitary valve body 102 or 202.

After solidification of the filler material, the mold apparatus is disassembled by removing the valve body mold halves 216 and 218 from the base 220. Either the valve body 102 or 202 then can be removed. Hence, the valve body 102 or 202 is produced in a single molding operation without machining and assembly of valve parts, thereby reducing labor and cost.

The foregoing description of the preferred embodiment of the present invention has been presented for purposes of illustration and description. It is not intended to be exhaustive or to limit the present invention to the precise form disclosed, and obviously many modifications and variations are possible in light of the above teachings. The embodiments were chosen and described in order to best explain the principles of the present invention and its practical application to thereby enable others skilled in the art to best utilize the present invenion in various embodiments and with various modifications as are suited to the particular use contemplated. It is intended that the scope of the present invention be defined by the claims appended hereto.

I claim the following:

1. A method for constructing a unitary gate valve with a mold, the unitary gate valve having a gate valve body, the mold having two halves which can be removably secured together on a base, the halves having cores for forming a fluid passage, the base having a removable core for forming a valve gate passage and another core for forming a packing area, comprising the steps of:

fabricating a mold, said mold comprising a base and two halves which can be removably secured together on said base, each said half of said mold comprising a fluid passage core, said base comprising a removable gate passage core and a packing area core, said mold halves cooperating to create a filler material gate for receiving a filler material;

assembling said mold so that said two halves and said base cooperate to define a cavity for forming said gate valve;

introducing said filler material into said filler material gate;

curing said filler material to form gate valve, said gate valve comprising a gate valve body having a fluid passage, a gate passage, and a packing area;

disassembling said mold; and removing said gate valve from said mold.

2. The method of claim 1, wherein said mold further comprises a mounting insert core.

3. The method of claim 1, further comprising the step of placing mounting inserts within said mold before introducing said filler material.

4. The method of claim 1, further comprising the step of injecting said filler material into said filler material gate.

5. The method of claim 1, further comprising the step of pouring said filler material into said filler material gate.

6. A method for constructing a unitary gate valve with a mold and a valve liner, the unitary gate valve having a gate valve body and an inner valve liner, the mold having two halves which can be removably secured together on a base, the valve liner having portions defining a fluid passage, a packing area, a gate passage, a gate seat, and sealing flanges, comprising the steps of:

fabricating a mold, said mold comprising a base and two halves which can be removably secured together on said base, each half of said mold comprising a fluid passage core which fits within the valve liner portion defining the fluid passage, said mold halves cooperating to create a filler material gate for receiving a filler material;

assembling said mold and said valve liner so that said two halves, said valve liner, and said base cooperate to define a cavity for forming said gate valve;

introducing said filler material into said filler gate and against said valve liner to fill said cavity;

curing said filler material to form said gate valve, said gate valve comprising the gate valve body and the valve liner which defines a fluid passage, a gate passage, and a packing area, said filler material being adhered to the valve liner;

disassembling said mold; and removing said gate valve from said mold.

* * * * *